United States Patent [19]

Shen et al.

[11] Patent Number: 5,493,655

[45] Date of Patent: Feb. 20, 1996

[54] METHOD AND APPARATUS FOR UPGRADING A DATA PROCESSING SYSTEM FROM A SINGLE PROCESSOR SYSTEM TO A MULTIPROCESSOR SYSTEM

[75] Inventors: Cheng-Lai Shen, Milpitas, Calif.; Kuo-Piao Shih, Taoyuan City; Wen-Lu Liao, Taipei, both of Taiwan

[73] Assignee: Acer Incorporated, Taipei, Taiwan

[21] Appl. No.: 85,125

[22] Filed: Jun. 30, 1993

[51] Int. Cl.[6] .............................. G06F 13/00; G06F 13/26
[52] U.S. Cl. ...................... 395/280; 395/281; 395/306; 395/309; 395/650; 395/800
[58] Field of Search .................................... 395/325, 650, 395/800

[56] References Cited

U.S. PATENT DOCUMENTS

| | | | |
|---|---|---|---|
| 3,676,861 | 7/1972 | Ruth | 340/172.5 |
| 4,816,990 | 3/1989 | Williams | 395/650 |
| 5,101,478 | 3/1992 | Fu et al. | 395/275 |
| 5,283,904 | 2/1994 | Carson et al. | 395/725 |
| 5,359,715 | 10/1994 | Heil et al. | 395/325 |

FOREIGN PATENT DOCUMENTS

| | | | |
|---|---|---|---|
| 90308062 | 7/1990 | European Pat. Off. | G06F 1/16 |
| 91114669 | 8/1991 | European Pat. Off. | G06F 13/40 |
| 61-101868 | 5/1986 | Japan | G06F 15/16 |

OTHER PUBLICATIONS

IBM Technical Disclosure Bulletin, vol. 35, No. 3, Aug. 1992, NY US pp. 306–316.
07/872,611 Apr. 22, 1992 (filed).
07/998,879 Dec. 28, 1992 (filed).

*Primary Examiner*—Jack B. Harvey
*Assistant Examiner*—Jeffrey K. Seto
*Attorney, Agent, or Firm*—Townsend and Townsend and Crew

[57] ABSTRACT

A data processing system includes a first central processing unit (CPU), at least one expansion port into which additional CPUs may be inserted, and a system controller. Interrupt circuitry coupled to said first CPU, said at least one expansion port, and said system controller, is configured to allow the dam processing system to operate as a multi-processor system, only one of the first and additional CPUs communicating with the system controller at any one time.

25 Claims, 5 Drawing Sheets

METHOD AND APPARATUS FOR UPGRADING A DATA PROCESSING SYSTEM FROM A SINGLE PROCESSOR SYSTEM TO A MULTIPROCESSOR SYSTEM

BACKGROUND OF THE INVENTION

The present invention relates to a multi-processor system, and more particularly to a multi-processor system which may be upgraded from a single-processor system merely by the insertion of an additional processor.

With the rapid pace of development in central processing unit (CPU) technology, obsolescence is a problem to both the manufacturers and the users of personal computers. A product which employs state of the art technology at the time its initial marketing may become obsolete within only a year or less. Personal computers employing 80286 CPUs are current examples. These obsolete computer systems remain operable, but often lack the capability of running software designed for use with systems having more advanced CPUs. In order to run such software on their existing hardware, users are forced to upgrade their systems, and in the process are faced with the following questions: Given a particular system's application, what level of upgrade is required to keep abreast of the current developments in processor and software technology (e.g., would an 80386 provide sufficient computing power, or is an upgrade to a more powerful processor, an 80486 or p5 for example, necessary)? What is the most economical way to expand a computer system from a single-processor system to a multiprocessor computer system in the event that the computing power of a single processor system is insufficient?

There are existing alternatives to the impractical solution of buying a new computer each time a new CPU is developed. One solution involves replacing the circuit board (i.e., mother board or an extended printed circuit board) upon which the system CPU is located with another circuit board having a more sophisticated CPU. Unfortunately, this alternative is not only expensive, it may also be inconvenient in that the user often must contact the original retailer or manufacturer to effect the replacement. A second solution involves providing a specially designed CPU circuit board in the original system on which a prepared location (e.g., an IC socket) is provided for inserting a second CPU when the original CPU on the board requires an upgrade. Upon insertion of the new CPU into the prepared location, the original CPU is disabled. Such a specially designed circuit board is described in copending U.S. patent application Ser. No. 07/872,611 for Upgradeable/Downgradeable Central Processing Unit Chip Computer System, filed on Apr. 22, 1992, and copending U.S. patent application Ser. No. 07/998,879 for Single Chip Replacement Upgradeable/ Downgradeable Data Processing System, filed on Dec. 28, 1992, the entire specifications of which are herein incorporated by reference. The second solution provides advantages not enjoyed by the first in that it eliminates the need to replace the whole circuit board. However, several drawbacks still remain. For example, to disable the original CPU is a waste of system resources. Additionally, the problem of converting a single-processor system to a multi-processor system is not addressed.

The problem of converting a single-processor system to a multi-processor system is best understood in the context of the differences between current single-processor and multi-processor systems. FIG. 1 is a simplified block diagram of a single-processor system according to the prior art. The system 10 comprises a CPU 11, a CPU bus 12, a local bus 13, an industry standard expansion bus 14 (shown as an EISA bus, but replaceable by an ISA or a VESA bus), an internal peripheral bus 15 (shown as an XD bus), a CPU-local bus interface 16, a local-EISA bus interface 17, an EISA-XD bus interface 18, a system controller 19 communicating with CPU bus 12 and local bus 13, and a bus controller 20 communicating with local bus 13, EISA bus 14 and XD bus 15. Bus controller 20 includes a coprocessor interface 21 communicating with CPU 11 via a coprocessor error signal line 24 (FERR*), and an error ignore signal line 25 (IGNNE*). When a coprocessor error occurs in CPU 11, coprocessor interface 21 sends an interrupt request signal to an interrupt input terminal (IRQ13) of an interrupt controller 22. Interrupt controller 22 also receives a plurality of interrupt request signals (IRQ1, IRQ3, . . . , IRQ12, IRQ14 and IRQ15) from EISA bus 14, which may be interrupt requests from a printer, a hard disk drive, etc. (not shown). Interrupt controller 22 includes an arbitrator (not shown) for determining the priorities of these interrupt requests. After arbitration, interrupt controller 22 sends an interrupt command to CPU 11 via a signal line 26 (INT), in response to which CPU 11 performs an interrupt routine corresponding to the particular interrupt request.

FIG. 2 is a simplified block diagram of a multi-processor system according to the prior art. The system comprises two CPUs 31 and 41, having associated CPU buses 32 and 42 respectively. CPU buses 32 and 42 communicate with a multi-processor bus 34 via multi-processor bus interfaces 33 and 43 respectively. As in the case of the single-processor system, the multi-processor system comprises a system controller 50, an interrupt controller 51, an EISA bus 38, and XD bus 39, a multiprocessor-EISA bus interface 48 and an EISA-XD bus interface 49. CPUs 31 and 41 have control ports 35 and 45, and coprocessor interfaces 36 and 46 respectively. CPU 41 is provided with an associated interrupt vector port 47. Coprocessor interfaces 36 and 46, perform substantially the same and communicate with CPUs 31 and 41 in substantially the same manner as described above with regard to the single-processor system.

In a multi-processor system, only one CPU can be directly associated with the peripheral input/output (I/O) of the system at any one time. Therefore the interrupt protocol for each CPU is different. When, for example, CPU 31 in the two-processor system of FIG. 2 intends to interrupt CPU 41, CPU 31 writes to a control port 45 of CPU 41. In the system of FIG. 2, other than the interrupt signal caused by a coprocessor error, CPU 31 is the only source of an interrupt signal to CPU 41. Therefore, in response to such an interrupt, CPU 41 acquires necessary information from the interrupt vector port 47 and performs an interrupt routine corresponding to the data written to control port 45.

In contrast, CPU 41 is not the only source of an interrupt signal to CPU 31. Therefore, when CPU 41 intends to interrupt CPU 31, and CPU 41 writes to a control port 35 of CPU 31, the interrupt request must first be arbitrated by interrupt controller 51. As shown in FIG. 2, the interrupt request signal line from CPU 41 to CPU 31 is designated IRQ13. After arbitration, interrupt controller 51 sends an interrupt command to CPU 31, in response to which CPU 31 performs an interrupt routine corresponding to the command of the interrupt controller 51 and the data written to control port 35.

It will be understood from the above discussion that converting a single-processor system to multi-processor system according to the prior art is a complex procedure. As a means of performing this conversion, previous technology has provided two CPU interface card holder slots on the mother board of a computer system (not shown). The CPUs are then combined with circuitry resembling CPU circuit boards 30 and 40 in FIG. 2. When only one CPU circuit board is inserted in the primary of the two holder slots, the system resembles a single-processor system. When it becomes necessary to convert the system from a single-processor system to a multi-processor system, the user purchases another CPU circuit board and inserts it into the secondary holder slot. Unfortunately, this solution may still require the user to contact the original retailer or manufacturer to obtain the second CPU board. Additionally, the user must purchase an entire CPU circuit board which is compatible with the original CPU circuit board. If the original CPU is sufficiently outdated, it may be difficult obtain a compatible CPU circuit board. Finally, in addition to these disadvantages, this solution does not address the problem of CPU upgrade capability.

SUMMARY OF THE INVENTION

The present invention provides a computer system which can easily be converted from a single-processor to a multi-processor system. The invention also provides a system design that facilitates the upgrade of the system processor.

According to the invention, a data processing system is disclosed which includes a first central processing unit (CPU), at least one expansion port into which additional CPUs may be inserted, and a system controller. Interrupt circuitry coupled to said first CPU, said at least one expansion port, and said system controller, is configured to allow the data processing system to operate as a multi-processor system, only one of the first and additional CPUs communicating with the system controller at any one time.

In a specific embodiment, a data processing system includes a first central processing unit (CPU) and an expansion port into which a second CPU may be inserted. The system employs a plurality of data buses. A first CPU control port, associated with the first CPU, is coupled to one of the data buses and is used for receiving and transmitting interrupt request signals from the second CPU. A bus controller is coupled to several of the data buses and comprises a first coprocessor interface, an arbitrator, and an interrupt controller. The first coprocessor interface is coupled to the first CPU and generates an interrupt request signal in response to a first coprocessor error signal. The arbitrator is coupled to the first coprocessor interface and receives and arbitrates interrupt request signals from the first coprocessor interface and the first CPU control port. The interrupt controller is coupled to the arbitrator and determines the priority of a plurality of interrupt request signals and transmits an interrupt command to the first CPU in response thereto. A second CPU control port, associated with the second CPU, is coupled to one of the data buses and is used for receiving interrupt request signals from the first CPU and transmitting interrupt request signals to the second CPU. Finally, a second coprocessor interface is coupled to the second CPU and generates an interrupt request signal in response to a second coprocessor error signal. A method for transmitting interrupt requests between CPUs in a multi-processor system is also described.

In a specific embodiment, the plurality of dam buses include a CPU bus, a local bus, an expansion bus, and an internal peripheral bus. More specifically, the internal peripheral bus comprises an XD bus, and the expansion bus is either an EISA bus, an ISA bus, or a VESA bus. The first CPU and the expansion port for the second CPU are coupled to the CPU data bus, the first and second CPU control ports are coupled to the internal peripheral bus, and the bus controller is coupled to the local bus, the expansion bus, and the internal peripheral bus.

In a further embodiment, the system includes a system controller coupled to said local bus, and a processor transferring circuit coupled to the system controller and the CPU bus. The processor transferring circuit allows the system controller to communicate with only one of the CPUs at any one time. This embodiment may also include a system memory and a system cache coupled to the local bus. Both the system memory and the system cache are controlled by the system controller.

Further embodiments include a discrete coprocessor coupled to said CPU bus for generating a third coprocessor error signal, at least one peripheral device coupled to the expansion bus, and a ROM BIOS coupled to the internal peripheral bus.

Thus, the present invention provides a single-processor system architecture which can be converted into a multi-processor system merely by inserting a CPU chip therein. According to the invention, the additional CPU need not necessarily match the first CPU. In other words, the two CPUs may be of different frequencies or model types, made by different manufacturers, or even of different grades (e.g., one CPU may be a 486 and the other may be a p5). The invention allows the user of a single-processor system to upgrade the system to match the technological development of CPUs by directly inserting a more sophisticated CPU therein. And, unlike previous systems, the system is concurrently converted from a single-processor system to a multi-processor system.

A further understanding of the nature and advantages of the present invention may be realized by reference to the remaining portions of the specification and the drawings.

DESCRIPTION OF THE SPECIFIC EMBODIMENTS

The present invention will be described with reference to FIGS. 3–5.

Figure 1:
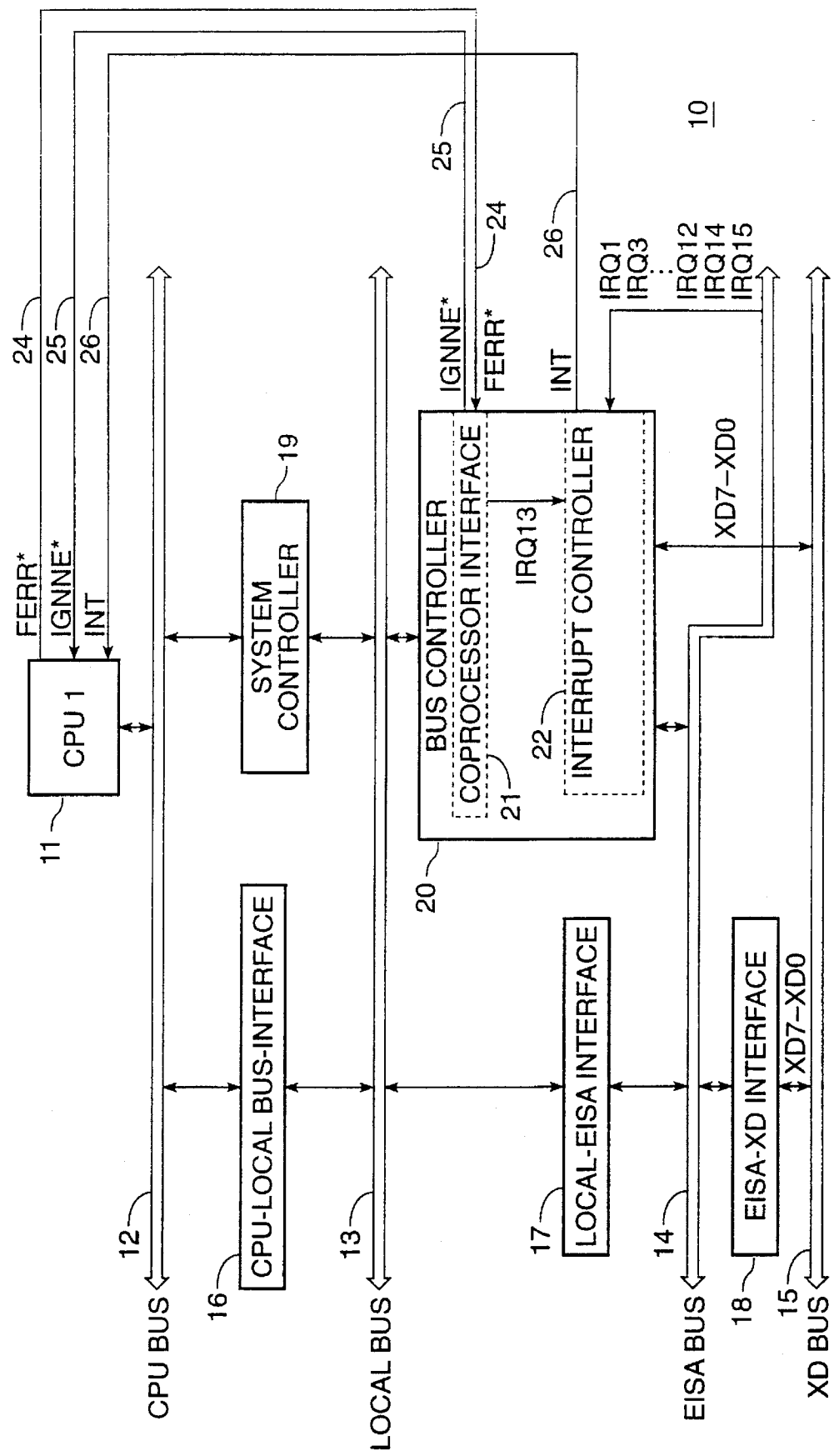
FIG. 1 is a simplified block diagram of a single-processor system according to the prior art.
Figure 3:
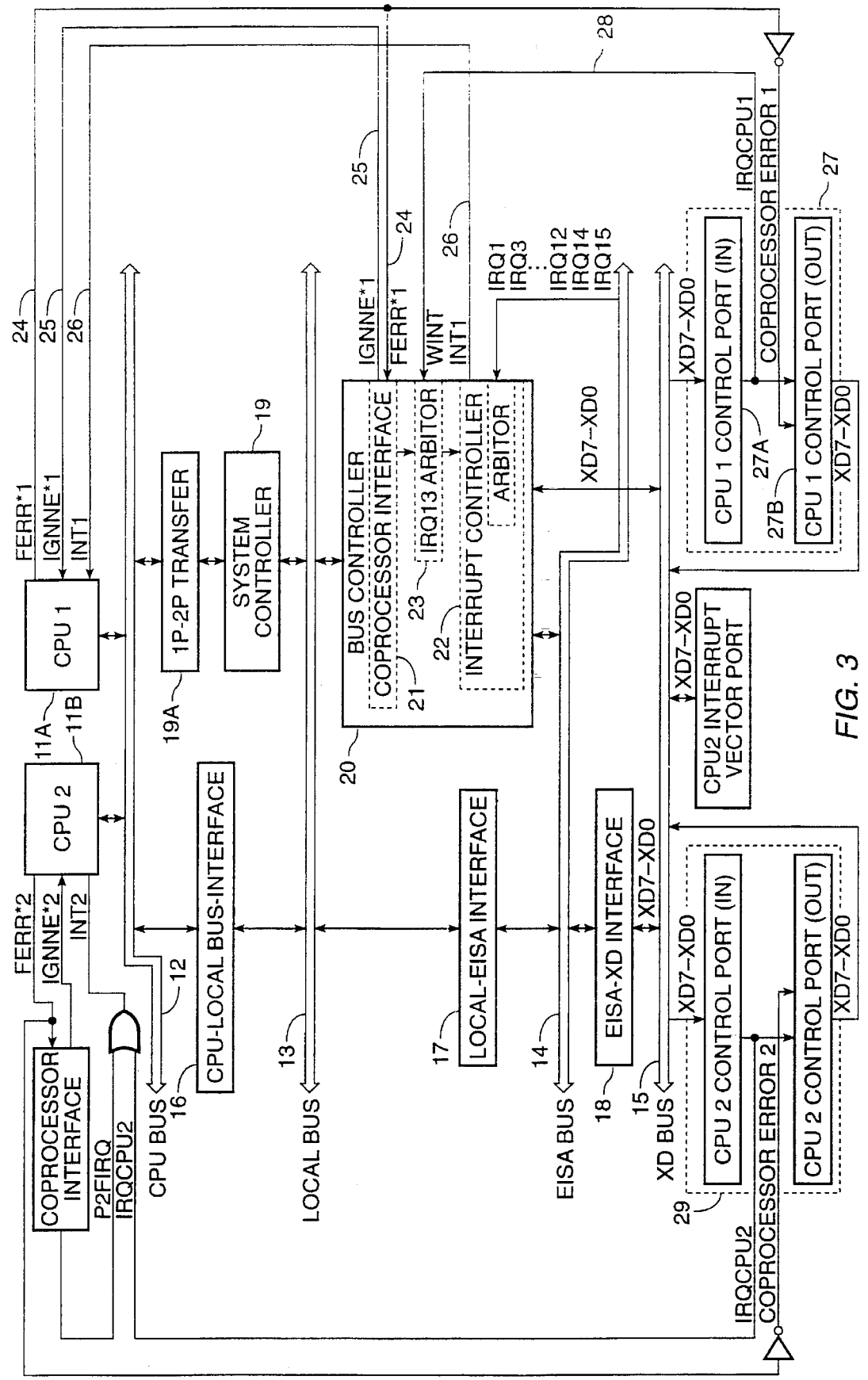
FIG. 3 is a simplified block diagram of a first embodiment of a multi-processor system upgraded from a single-processor system according to the invention.

FIG. 3 is a simplified block diagram of a first embodiment of a multi-processor system upgraded from a single-processor system according to the invention. In the upgraded system, two CPUs 11A and 11B are employed. The functions of system elements 12–19 and 24–26 in FIG. 3 are substantially the same as for the corresponding elements in FIG. 1. Therefore, or a detailed description of the operation of these elements, reference may be had to the earlier discussion with regard to FIG. 1.

As stated earlier, in a multi-processor system only one CPU can be directly associated with the peripheral I/O of the system. Therefore the system must provide different interrupt arrangements for each of the CPUs. In the embodiment shown in FIG. 3, CPU 11A is provided with a control port 27 (the block encompassed by broken lines in the lower-right corner of FIG. 3) which is coupled to the internal peripheral bus (XD bus) 15. For purposes of this discussion, control port 27 is divided into an input portion 27A and an output portion 27B. When CPU 11B intends to interrupt CPU 11A, CPU 11B writes to input portion 27A. In response, control port 27 sends an interrupt request signal to bus controller 20. In addition to coprocessor interface 21 and interrupt controller 22, bus controller 20 includes an IRQ13 arbitrator 23 which receives and arbitrates the interrupt request signals from coprocessor interface 21 and control port 27. Bus controller 20 then sends an arbitration result to the IRQ13 input terminal of interrupt controller 22. Interrupt controller 22 then sends an interrupt command to CPU 11A. CPU 11A determines whether such an interrupt originates from IRQ13 arbitrator 23 via interrupt controller 22, or from other sources of interruption on expansion bus 14 (shown as an EISA bus) based on interrupt vectors in the interrupt controller 22. If it is determined that the interrupt comes from IRQ13 arbitrator 23, CPU 11A further determines whether the interrupt is requested by CPU 11B or is the result of a coprocessor error. A coprocessor error is indicated by a coprocessor error value 24A inputted to output portion 27B of control port 27. In this manner, CPU 11B may successfully interrupt CPU 11A.

When CPU 11A intends to interrupt CPU 11B, CPU 11A needs only write to a control port 29 associated with CPU 11B. Aside from the coprocessor error generated in CPU 11B itself, CPU 11A is the only other source of an interrupt request for CPU 11B. Therefore, CPU 11B can easily determine where the interrupt request comes from before performing the corresponding interrupt routine.

The tasks to be performed by CPUs 11A and 11B are allocated under the control of a processor transferring circuit 19A. Processor transferring circuit 19A receives task information transmitted from system controller 19 and assigns the task to one of the CPUs through CPU bus 12. When CPUs 11A and 11B need to transmit information, the information is also managed by processor transferring circuit 19A before being transmitted to system controller 19. Therefore, system controller 19 communicates with only one CPU at any one time.

Figure 2:
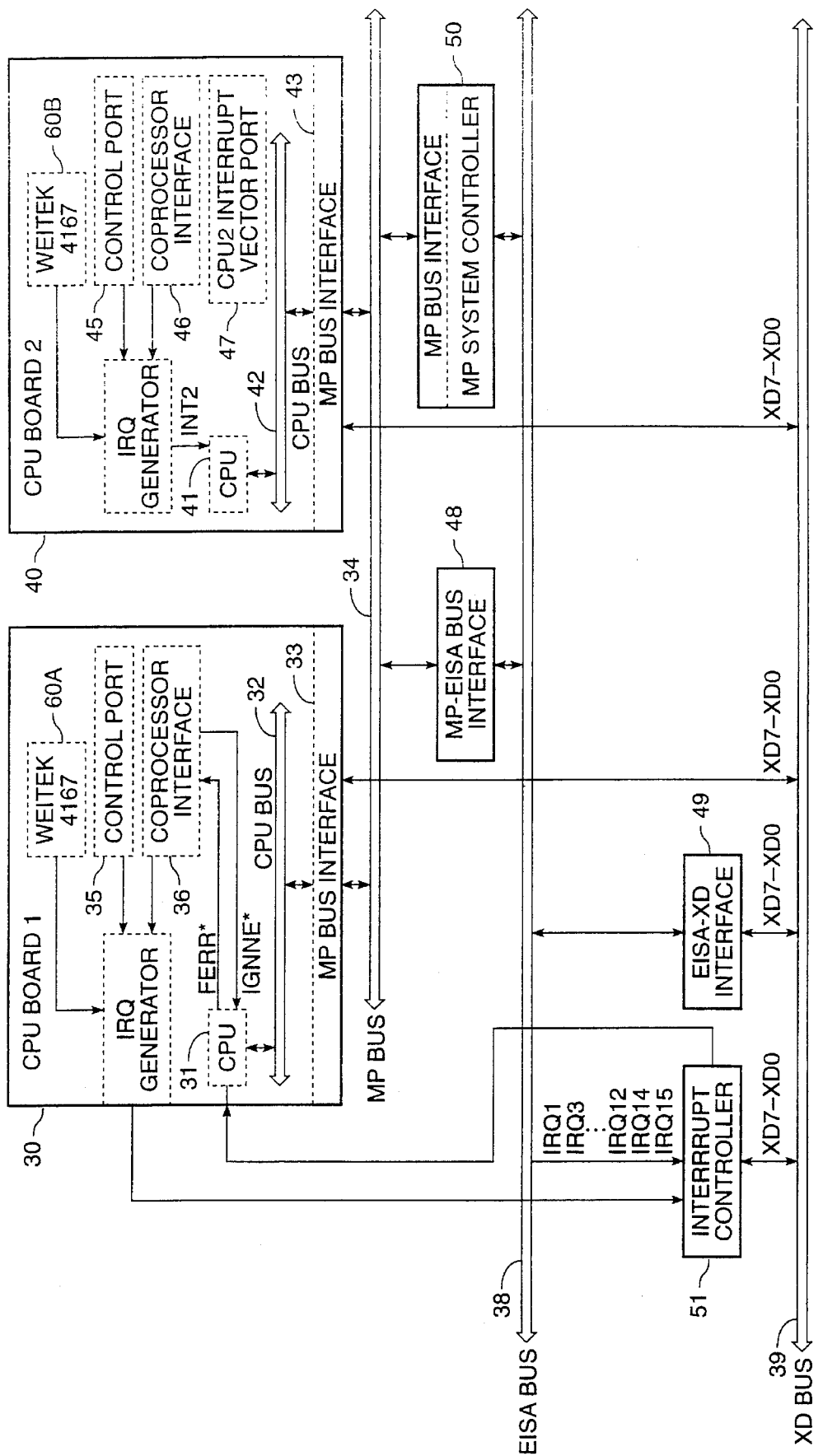
FIG. 2 is a simplified block diagram of a multi-processor system according to the prior art.

The multi-processor system of FIG. 3 has several advantages which become clear when compared to the multi-processor system of FIG. 2. First, CPU buses 32 and 42, and multi-processor interfaces 33 and 43 associated with CPUs 31 and 41 are eliminated, simplifying the system. Second, the system can operate with only one processor, or it can be upgraded from a single-processor system to a multi-processor system merely by adding a CPU chip (i.e., CPU 11B). This obviates the need to purchase an entire matching CPU circuit board to implement a multi-processor system. Finally, CPUs 11A and 11B need not be of the same frequency, nor be produced by the same manufacturer, nor even be of the same type as long as they can both match the logic protocols of the system.

Figure 4:
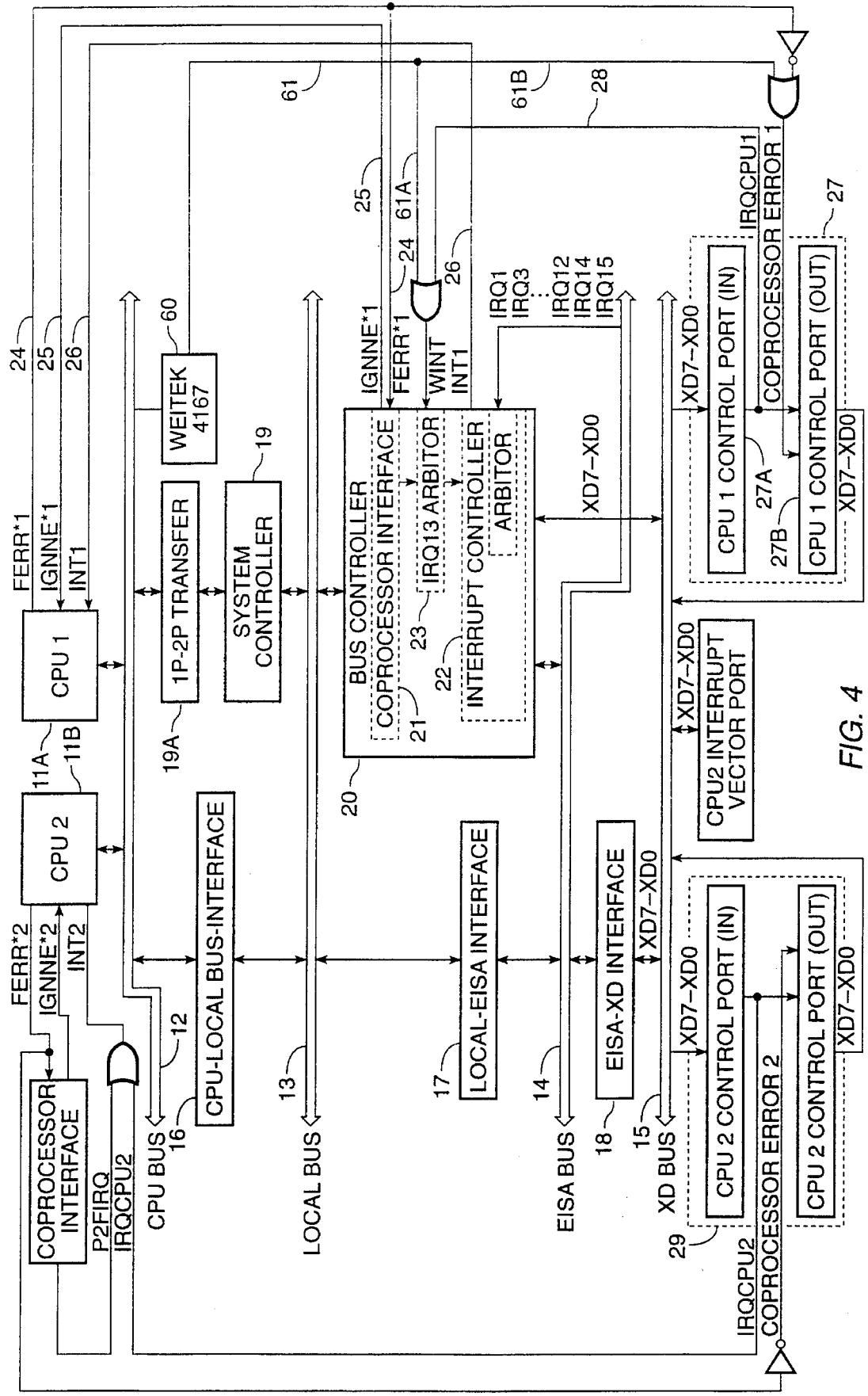
FIG. 4 is a simplified block diagram of a second embodiment of a multi-processor system upgraded from a single-processor system according to the invention.

FIG. 4 is a simplified block diagram of a second embodiment of a multi-processor system upgraded from a single-processor system according to the invention. In the case where CPU 11A has limited capabilities, a coprocessor 60 (here shown as a WEITEK model no. 4167), may be provided on CPU bus 12. Such a coprocessor may be optionally added to the prior art single-processor system of FIG. 1. Likewise, two coprocessors may be added to the prior art multi-processor system of FIG. 2. Coprocessor 60 has an associated coprocessor error signal line 61 (61A, 61B). The signal on line 61A is ORed with the output from input portion 27A of control port 27, the result being transmitted to IRQ13 arbitrator 23. The signal on line 61B is ORed with the coprocessor error signal from CPU 11A, the result being transmitted to output portion 27B of control port 27. In response to a coprocessor error generated in coprocessor 60, the system performs an interrupt process to interrupt CPU 11A similar to the process described with reference to FIG. 3.

In an alternative embodiment, the coprocessor interface, the arbitrator, and the interrupt controller can be separated from the bus controller. In such an embodiment, the interrupt signal generated by the second CPU to interrupt the first CPU can be transmitted to the interrupt controller directly, or to the interrupt controller indirectly through the coprocessor interface and the arbitrator.

Figure 5:
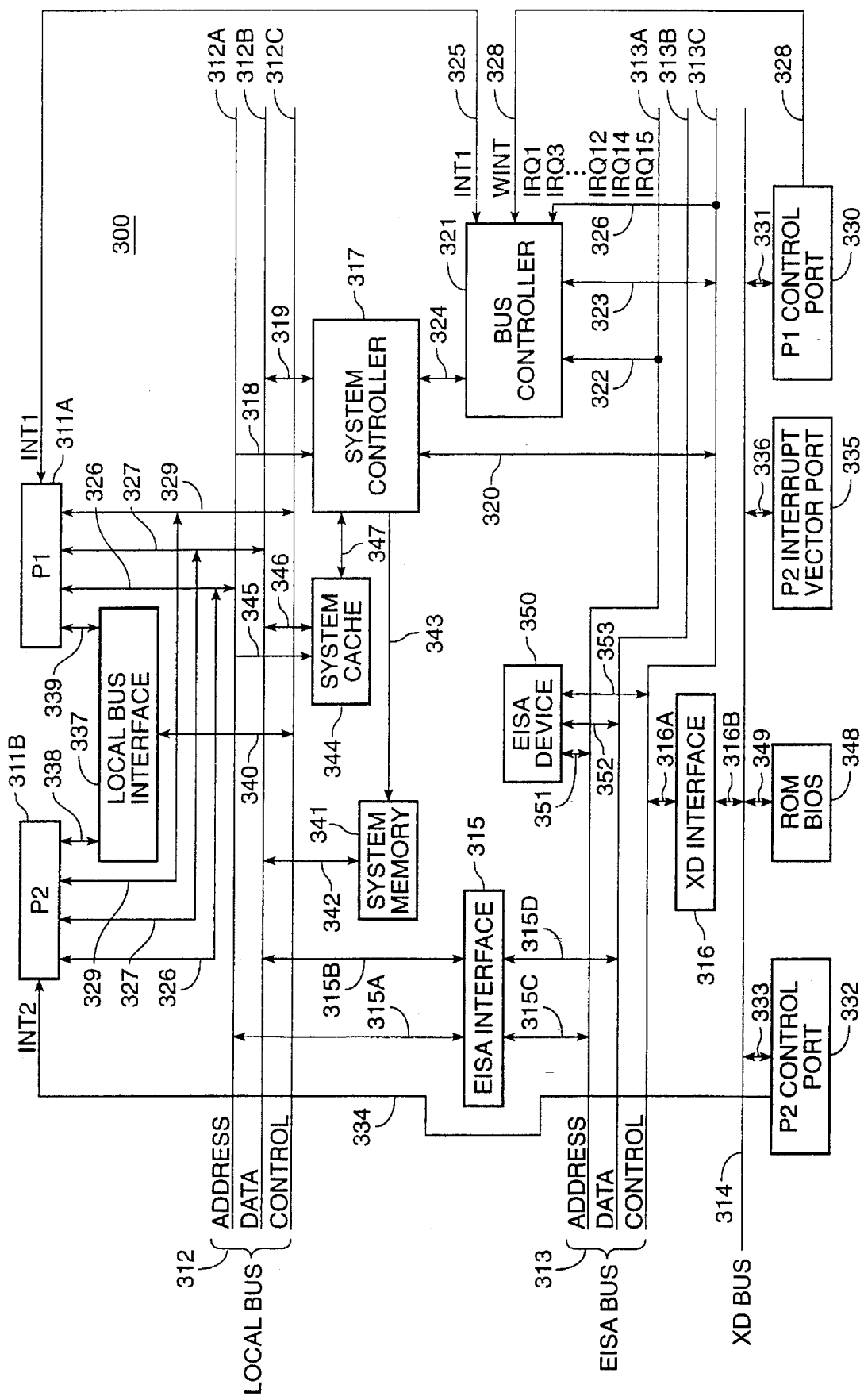
FIG. 5 is a simplified block diagram of a third embodiment of a multi-processor system upgraded from a single-processor system according to the invention.

FIG. 5 is a simplified block diagram of a third embodiment of a multi-processor system upgraded from a single-processor system according to the invention. The multi-processor system 300 comprises a local bus 312 comprising an address bus 312A, a data bus 312B, and a control bus 312C, an expansion bus 313 (shown as an EISA bus) comprising an address bus 313A, a data bus 313B, and a control bus 313C, an internal peripheral bus (XD bus) 314, an EISA interface 315 between local bus 312 and EISA bus 313 for transferring signals on buses 312A and 312B of local bus 312 to EISA bus 313 through signal lines 315A–315D, and an XD interface 316 for transferring signals on bus 313C of EISA bus 313 to XD bus 314 through signal lines 316A and 316B.

A system controller 317 communicates with address and control buses 312A and 312C of local bus 312 through signal lines 318 and 319, and with control bus 313C of EISA bus 313 through a signal line 320. A bus controller 321 communicates with system controller 317 through a signal line 324, with address and control buses 313A and 313C of EISA bus 313 through signal lines 322 and 323, and receives interrupt request signals on line 326 transmitted from EISA bus 313.

As with other multi-processor systems only one CPU can be directly associated with the peripheral I/O of the system at any given time. Thus, CPUs 311A and 311B must communicate with each other through interrupt signals. When CPU 311B intends to interrupt CPU 311A, CPU 311B writes a specific value to control port 330 of CPU 31 1A through line 331. In response, control port 330 sends an interrupt request signal WINT to bus controller 321 through line 328 for the purpose of interrupting CPU 311A. The signal WINT is transmitted to the IRQ13 input terminal of an internal arbitrator (not shown) of bus controller 321. After the internal arbitrator determines that the interrupt request on the IRQ13 input terminal has the highest priority, bus controller 321 sends an interrupt command INT1 on line 325 to CPU 31 1A. CPU 311A then accesses information at addresses specified by an interrupt vector provided by bus controller 321 and performs a corresponding interrupt routine.

When CPU 311A intends to interrupt CPU 311B, CPU 311A writes a specific value to control port 332 of CPU 311B through line 333. CPU 311B determines whether there is an interrupt from the state of signal INT2 on line 334. If an interrupt is detected, CPU 311B, under the control of system controller 317, reads an interrupt vector from interrupt vector port 335 through line 336 and performs a corresponding interrupt routine.

Address bus 312A, data bus 312B, and control signal lines 326, 327, and 329 are part of local bus 312. Control signal lines 338 and 339 are handled by a local bus interface 337 which communicates with control bus 312C of local bus 312 through line 340. Interface 337 arbitrates the priority of CPUs 311A and 311B to use local bus 312, and is responsible for "snooping" when either one of the CPUs starts a memory cycle.

System 300 further comprises a ROM BIOS 348 which communicates with XD bus 314 through line 349. At least one EISA device 350 (e.g., a hard disk controller, a software controller, etc.) is coupled to EISA bus 313 and communicates with buses 313A–313C of EISA bus 313 through lines 351–353. A system memory 341, which is controlled by system controller 317 through line 343, communicates with data bus 312B of local bus 312 through line 342. A system cache 344, which is controlled by the system controller 317 through line 347, communicates with address and data buses 312A and 312B of local bus 312 through lines 345 and 346. In the above-described embodiments, the CPUs preferably include a write-back cache as an internal memory.

While the invention has been particularly shown and described with reference to specific embodiments thereof, it will be understood by those skilled in the art that the foregoing and other changes in the form and details may be made therein without departing from the spirit or scope of the invention.

What is claimed is:

1. A data processing system, comprising:

a first central processing unit (CPU);

an expansion port into which a second CPU chip may be directly inserted;

a plurality of data buses;

a first CPU control port coupled to one of said data buses and associated with said first CPU, said first CPU control port for receiving and interrupt request signals from and transmitting interrupt request signals to said expansion port when said second CPU is inserted therein;

a bus controller coupled to said plurality of data buses, said bus controller comprising:

a first coprocessor interface coupled to said first CPU, said first coprocessor interface generating an interrupt request signal in response to a first coprocessor error signal;

an arbitrator coupled to said first coprocessor interface for receiving and arbitrating interrupt request signals from said first coprocessor interface and said first CPU control port; and an interrupt controller coupled to said arbitrator for determining the priority of a plurality of interrupt request signals and transmitting an interrupt command to said first CPU in response thereto;

a second CPU control port coupled to one of said data buses and associated with said expansion port, said second CPU control port for receiving interrupt request signals from said first CPU and transmitting interrupt request signals to said expansion port when said second CPU is inserted therein; and a second coprocessor interface coupled to said expansion port, said second coprocessor interface generating an interrupt request signal in response to a second coprocessor error signal;

wherein said data processing system is operable to run as a single processor system when said expansion port is empty, and a multiple processor system when said second CPU is inserted in said expansion port.

2. The data processing system of claim 1 wherein the first and second CPUs comprise semiconductor microprocessors.

3. The data processing system of claim 1 wherein the plurality of data buses comprise a CPU bus, a local bus, an expansion bus, and an internal peripheral bus.

4. The data processing system of claim 3 wherein the internal peripheral bus comprises an XD bus, and the expansion bus is from the group consisting of an EISA bus, an ISA bus, and a VESA bus.

5. The data processing system of claim 3 wherein the first CPU and the expansion port are coupled to said CPU data bus, the first and second CPU control ports are coupled to said internal peripheral bus, and said bus controller is coupled to said local bus, said expansion bus, and said internal peripheral bus.

6. The data processing system of claim 3 further comprising:

a system controller coupled to said local bus; and a processor transferring circuit coupled to said system controller and said CPU bus, said processor transferring circuit for enabling said system controller to communicate with only one of said first and second CPUs at any one time when said second CPU is inserted into said expansion port.

7. The data processing system of claim 6 further comprising:

a system memory coupled to said local bus and controlled by said system controller; and a system cache coupled to said local bus and controlled by said system controller.

8. The data processing system of claim 3 further comprising an interrupt vector port coupled to said internal peripheral bus for storing interrupt vectors associated with said expansion port when said second CPU is inserted therein.

9. The data processing system of claim 3 further comprising a coprocessor coupled to said CPU bus for generating a third coprocessor error signal.

10. The data processing system of claim 3 further comprising at least one peripheral device coupled to the expansion bus.

11. The data processing system of claim 3 further comprising a ROM BIOS coupled to the internal peripheral bus.

12. The data processing system of claim 1 wherein said first coprocessor interface is coupled to said first CPU by means of a first coprocessor error signal line and a first error ignore signal line, and said second coprocessor interface is coupled to said expansion port by means of a second coprocessor error signal line and a second error ignore signal line.

13. The data processing system of claim 1 wherein said expansion port comprises a CPU chip socket positioned on a circuit board on which said first CPU is also positioned.

14. A data processing system, comprising:

a first central processing unit (CPU);

an expansion port into which a second CPU chip may be directly inserted;

a CPU bus coupled to said first CPU and said expansion port;

a CPU/local bus interface;

a local bus coupled to said CPU bus by means of said CPU/local bus interface;

a local/expansion bus interface;

an expansion bus coupled to said local bus by means of said local/expansion bus interface;

an expansion/peripheral bus interface;

an internal peripheral bus coupled to said expansion bus by means of said expansion/peripheral bus interface;

a first CPU control port coupled to said internal peripheral bus and associated with said first CPU, said first CPU control port for receiving interrupt request signals from and transmitting interrupt request signals to said expansion port when said second CPU is inserted therein;

a bus controller coupled to said local bus, said expansion bus, and said internal peripheral bus, said bus controller comprising:

a first coprocessor interface coupled to said first CPU by means of a first coprocessor error signal line and a first error ignore signal line, said first coprocessor interface generating an interrupt request signal in response to a first coprocessor error signal;

an arbitrator coupled to said first coprocessor interface for receiving and arbitrating interrupt request signals from said first coprocessor interface and said first CPU control port; and an interrupt controller coupled to said arbitrator for determining the priority of a plurality of interrupt request signals and transmitting an interrupt command to said first CPU in response thereto;

a second CPU control port coupled to said internal peripheral bus and associated with said expansion port, said second CPU control port for receiving interrupt request signals from said first CPU and transmitting interrupt request signals to said expansion port when said second CPU is inserted therein;

a second coprocessor interface coupled to said expansion port by means of a second coprocessor error signal line and a second error ignore signal line, said second coprocessor interface generating an interrupt request signal in response to a second coprocessor error signal;

a system controller coupled to said local bus; and a processor transferring circuit coupled to said system controller and said CPU bus, said processor transferring circuit for enabling said system controller to communicate with only one of said first and second CPUs at any one time when said second CPU is inserted into said expansion port;

wherein said data processing system is operable to run as a single processor system when said expansion port is empty, and a multiple processor system when said second CPU is inserted in said expansion port.

15. The data processing system of claim 14 wherein the first and second CPUs comprise semiconductor microprocessors.

16. The data processing system of claim 14 wherein the internal peripheral bus comprises an XD bus, and the expansion bus is from the group consisting of an EISA bus, an ISA bus, and a VESA bus.

17. The data processing system of claim 14 further comprising:

a system memory coupled to said local bus and controlled by said system controller; and a system cache coupled to said local bus and controlled by said system controller.

18. The data processing system of claim 14 further comprising an interrupt vector port coupled to said internal peripheral bus for storing interrupt vectors associated with said expansion port when said second CPU is inserted therein.

19. The data processing system of claim 14 further comprising a coprocessor coupled to said CPU bus for generating a third coprocessor error signal.

20. The data processing system of claim 14 further comprising at least one peripheral device coupled to the expansion bus.

21. The data processing system of claim 14 further comprising a ROM BIOS coupled to the internal peripheral bus.

22. The data processing system of claim 14 wherein said expansion port comprises a CPU chip socket positioned on a circuit board on which said first CPU is also positioned.

23. A method for transmitting central processing unit (CPU) interrupts between CPUs in a data processing system, the data processing system having a first CPU and an expansion port in which a second CPU may be directly inserted, first and second CPU control ports, an arbitrator, and an interrupt controller, the method comprising the steps of:

(1) inserting said second CPU into said expansion port;

(2) transmitting a first interrupt signal from the second CPU to the first CPU control port;

(3) transmitting a first interrupt request signal from the first CPU control port to the arbitrator in response to said first interrupt signal;

(4) transmitting a first coprocessor error signal from the first CPU to the first coprocessor interface;

(5) transmitting a first coprocessor interrupt request from the first coprocessor interface to the arbitrator in response to said first coprocessor error signal;

(6) arbitrating said first interrupt request signal and said first coprocessor interrupt request, said arbitrating step generating an arbitration result;

(7) transmitting a first interrupt command from the arbitrator to the interrupt controller in response to said arbitration result;

(8) determining whether said first interrupt command originates from the interrupt controller;

(9) determining whether said first interrupt command originates from a peripheral device;

(10) determining whether said first interrupt command originates from the second CPU;

(11) determining whether said first interrupt command is derived from said first coprocessor error signal;

(12) transmitting said first interrupt command to the first CPU;

(13) transmitting a second interrupt signal from the first CPU to the second CPU control port;

(14) transmitting a second coprocessor error signal from the second CPU;

(15) determining whether a second interrupt request signal originates from the second CPU control port;

(16) determining whether said second interrupt request originates from the second coprocessor interface; and

(17) transmitting a second interrupt command to the second CPU.

24. A data processing system, comprising:

a first central processing unit (CPU);

at least one expansion port into which at least one additional CPU chip may be directly inserted;

a system controller; and interrupt circuitry coupled to said first CPU, said at least one expansion port, and said system controller, said interrupt circuitry being configured to allow the data processing system to operate as a multiple processor system when said at least one additional CPU chip is directly inserted in said expansion port and as a single processor system when said expansion port is empty, only one of said first and said at least one additional CPU communicating with said system controller at any one time.

25. The data processing system of claim 24 wherein said at least one expansion port comprises at least one CPU chip socket positioned on a circuit board on which said first CPU is also positioned.

* * * * *

UNITED STATES PATENT AND TRADEMARK OFFICE
CERTIFICATE OF CORRECTION

PATENT NO. : 5,493,655
DATED : February 20, 1996
INVENTOR(S) : Cheng-Lai Shen, Kuo-Piao Shih, Wen-Lu Liao It is certified that error appears in the above-identified patent and that said Letters Patent is hereby corrected as shown below:

On the title page:

Following the filing date, please insert:

[30]  Foreign Application Priority Data

Feb. 20, 1993   People's Republic of China ......................... 93 1 02406.4

Signed and Sealed this

Second Day of July, 1996

Attest:

BRUCE LEHMAN

*Attesting Officer*   *Commissioner of Patents and Trademarks*